United States Patent [19]

Keller

[11] Patent Number: 4,604,122

[45] Date of Patent: Aug. 5, 1986

[54] METHOD OF SENSING GOBS OF MOLTEN GLASS

[75] Inventor: René Keller, Zurich, Switzerland

[73] Assignee: Emhart Industries, Inc., Farmington, Conn.

[21] Appl. No.: 780,058

[22] Filed: Sep. 25, 1985

[30] Foreign Application Priority Data

Sep. 28, 1984 [GB] United Kingdom ................ 8424614

[51] Int. Cl.$^4$ ............................................. C03B 5/24
[52] U.S. Cl. .......................................... 65/29; 65/158; 65/163; 65/164
[58] Field of Search ................. 65/158, 163, 164, 29

[56] References Cited

U.S. PATENT DOCUMENTS

| | | | |
|---|---|---|---|
| 3,455,637 | 7/1969 | Howard | 356/204 |
| 3,574,587 | 4/1971 | Grundy et al. | 65/158 |
| 3,874,864 | 4/1975 | Peters et al. | 65/164 X |
| 4,205,973 | 6/1980 | Ryan | 65/158 X |
| 4,459,146 | 7/1984 | Farkas et al. | 65/164 X |
| 4,541,856 | 9/1985 | Maillard et al. | 65/158 X |

*Primary Examiner*—Arthur Kellogg
*Attorney, Agent, or Firm*—Arthur B. Moore

[57] ABSTRACT

Gobs of molten glass are sensed as they pass along a path (12) which leads to a mold arrangement (10) of a glassware forming machine. Ultrasonic radiation is transmitted towards a point on the path so that the radiation is reflected by the gob to a detector (30). One or more parameters of the radiation detected are compared with an equal number of expected parameters for the radiation and a signal indicating the presence of a gob is produced if the or each parameter is consistent with its equivalent expected parameter.

6 Claims, 3 Drawing Figures

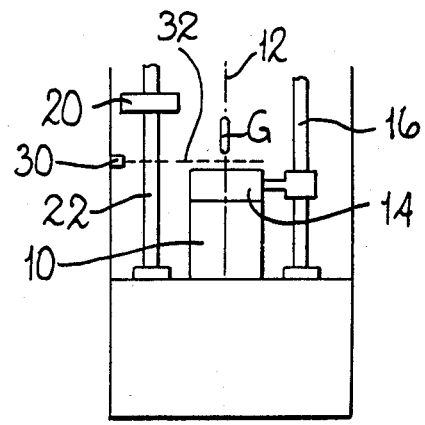
Fig_1
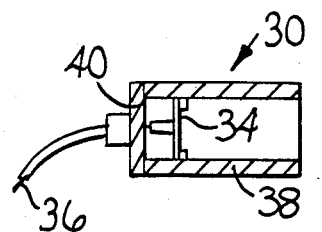
Fig_2
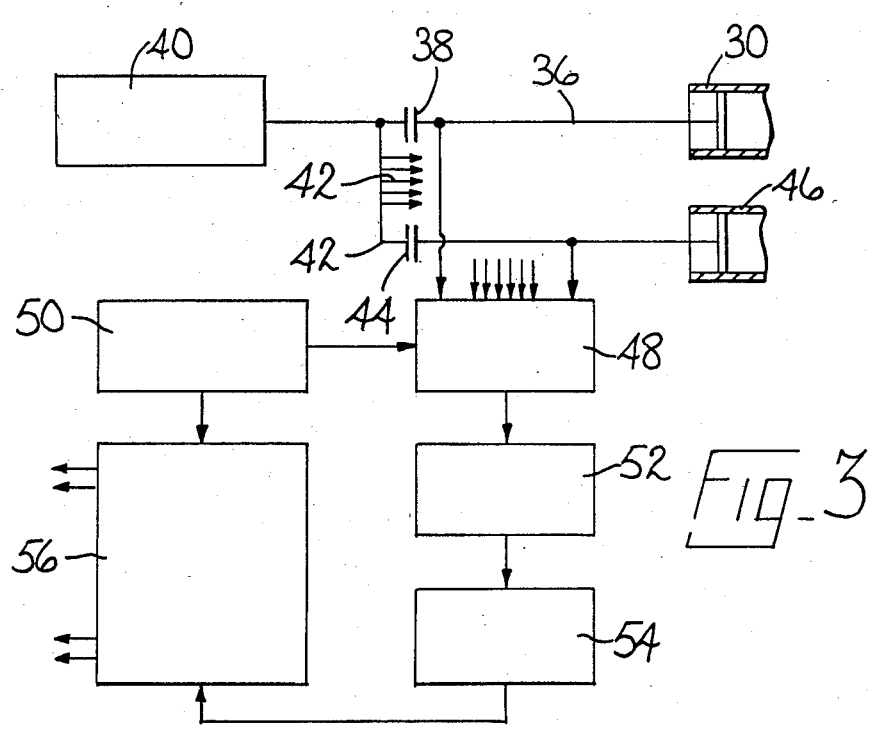
Fig_3

METHOD OF SENSING GOBS OF MOLTEN GLASS

BACKGROUND OF THE INVENTION

This invention is concerned with a method of sensing gobs of molten glass as they pass along a path which leads to a mould arrangement of a glassware forming machine. Although the invention is applicable to other types of glassware forming machine, it finds particular utility in glassware forming machines of the individual section type.

Glassware forming machines of the individual section type are well known and comprise a plurality of individual glassware forming units, called sections, which are arranged side by side to receive gobs of molten glass from a common source and to feed their output to a common conveyor. Each section has a parison mould arrangement at which gobs of molten glass are formed into parisons either by a pressing operation or by a blowing operation, a blow mould arrangement at which parisons are blown to the shape of the required container, transferring means for transferring parisons from the parison mould arrangement to the blow mould arrangement, and take-out means for removing completed containers from the blow mould arrangement. A machine may comprise six, eight, or ten sections and the sections receive gobs of molten glass in sequence from a common source. Thus, in the case of a six section machine, if a cycle of operation of the machine is represented by 360°, gobs are delivered at approximately 60° intervals and the sections being their operation at approximately 60° intervals so that, at any given time, all the sections are at different stages of their operation. The machine is controlled by timing means which causes the various events at each section to occur in the required sequence and synchronises the operation of the various sections. In older types of machines, the timing means comprises a timing drum carrying cams which continuously rotates so that the cams can operate valves in the required sequence. In more modern machines, the timing means is electronic and may involve one or more computers.

It has been recognised that it is desirable to provide signals indicating the arrival of the gobs of molten glass at the sections of the glassware forming machine. Such signals can be used to various purposes, for example for ascertaining the flight time of the gob from the common source to a particular section (the time varying from section to section because the distances involved are different), for synchronising the operation of the section with the actual arrival of the gob, or detecting the size of the gob from the length of the signal. To this end, in some machines, each section has been provided with a gob detector which is located so that it can detect the arrival of a gob at the parison forming arrangement of the section. In this way, it is possible to provide signals indicating the arrival of the gobs. The detectors used hitherto detect infra-red radiation emitted by the gob. However, the provision of such detectors in an environment made generally hostile by the proximity of molten glass requires that the detectors are protected from the environment and that wiring thereto is also so protected. Furthermore, accessability of the detectors in the event of a malfunction is limited unless the machine is closed down with a resulting loss of production. Furthermore, such infra-red detectors are susceptible to stray radiation which may cause erroneous readings.

It is an object of the present invention to provide a method of sensing gobs of molten glass as they pass along a path which leads to a mould arrangement of a glassware forming machine in which the possibility of erroneous readings by the detector used is reduced to a minimum.

BRIEF SUMMARY OF THE INVENTION

The invention provides a method of sensing gobs of molten glass as they pass along a path which leads to a mould arrangement of a glassware forming machine, the method comprising transmitting ultrasonic radiation towards a point on the path so that, when the radiation arrives at the point while a gob is occupying the point, the radiation is reflected by the gob towards a detector which detects the reflected radiation, comparing one or more parameters of the radiation detected by the detector with an equal number of expected parameters for radiation which has been reflected by a gob at said point on the path, and producing a signal indicating the presence of a gob if the or each parameter is consistent with its equivalent expected parameter.

A method according to the last preceding paragraph is less susceptible to erroneous reading produced by stray radiation because ultrasonic radiation is not normally present in a glassware forming machine and also because the comparison of one or more parameters of the radiation detected by the detector with an equal number of expected parameters for radiation which has been reflected by a gob at said point on the path removes substantially all possibility of the signal indicating the presence of a gob being produced when in fact there was no such gob present.

In order to eliminate the possibility of error caused by radiation reflected from objects other than a gob, the amplitude of the radiation detected by the detector may be compared with an expected amplitude. Thus, if the amplitude of the reflected radiation is less than the expected amplitude, this indicates that the reflected radiation has been reflected by an object which has a lower reflectability than a gob. For example, the point on the path of the gob may periodically by occupied by a swab brush by which lubrication is introduced into the mould. In this case, radiation may be reflected from the swab brush and detected by the detector and, since the swab brush is exactly where the gob is expected to be, it is possible that the swab brush may be mistaken for a gob unless the amplitude is taken into consideration since the reflectability of a swab brush is considerably lower than that of a gob.

In order to eliminate error created by radiation reflected by objects which are not at the point on the path but cross the line between the point of transmission of the ultrasonic radiation and said point, for example a funnel or a baffle may cross this line, the time taken by the radiation to travel from its transmission to its detection may be calculated. This time may be calculated from the phase difference between the radiation detected by the detector and the radiation transmitted and this phase difference may be used in a comparison with an expected phase difference.

The radiation may be transmitted as a continuous beam and, in this case, the duration of the reflected beam of radiation detected by the detector may be compared with an expected duration. This eliminates the possibility of error due to reflections from objects which cross the line of travel of the radiation but take either more or less time to cross the line than a gob is expected to take. The radiation may also be transmitted as a series of pulses and the number of consecutive pulses in the radiation detected by the detector may be compared with an expected number to achieve a measure of how long the object causing the reflection has taken to cross the line of transmission and reflection.

Conveniently, the radiation may be transmitted and detected by a piezoxyde ultrasonic disc. The disc may be energized to cause it to transmit ultrasonic radiation either continuously or periodically so that the radiation is transmitted as a series of pulses.

BRIEF DESCRIPTION OF THE DRAWINGS

There now follows a detailed description, to be read with reference to the accompanying drawings, of a method of sensing gobs which is illustrative of the invention. It is to be understood that the illustrative method has been selected for description by way of example and not of limitation.

In the drawings:

FIG. 1 is a diagrammatic front-elevation view of a single section of a glassware forming machine of the individual section type;

FIG. 2 is a cross-sectional view taken through a transceiver used in the illustrative method both to transmit ultrasonic radiation and to detect ultrasonic radiation; and FIG. 3 is a diagrammatic view of an electronic circuit used in the illustrative method.

DETAILED DESCRIPTION OF PREFERRED EMBODIMENT OF THE INVENTION

FIG. 1 shows a front elevational view of a single section of a glassware forming machine of the individual section type. It is to be understood that further sections of the machine (not shown) are arranged to one or both sides of the section shown in the drawing. The section comprises a parison mould 10 in which gobs of molten glass which travel along a path 12 to enter the parison mould 10 through a funnel 14 are moulded to the shape of a mould cavity (not shown) of the mould. The funnel 14 rests on top of the parison mould 10 which is divided into two side portions and acts to guide a gob G into the mould 10. Once the gob G has entered the mould 10, the funnel 14 is removed by being raised away from the mould 10 and moved arcuately about a shaft 16 by which the funnel is supported. A baffle 20 is mounted on a shaft 22 for arcuate movement about the shaft 22 and also for vertical movement (only an end view of the baffle 20 is visable in FIG. 1 but the baffle projects from the shaft 22 sufficiently to be positionable on the mould 10). The baffle 20 can be positioned on top of the funnel 14 when the funnel 14 is on top of the mould 10 or, alternatively, can be positioned on top of the mould 10 itself. Where a parison is to be formed in the mould 10 by a blowing operation, after the gob has entered the mould, the baffle is moved into position on top of the funnel 14 so that air can be blown through the baffle 20 and the funnel 14 into the mould 10 to press the gob downwardly in the mould 10. The baffle 20 is then removed from the funnel 14 and the funnel 14 is removed from the mould 10. The baffle 20 is then moved on to the top of the mould 10 so that air blown into the mould 10 from beneath forces the glass upwardly against the sides of the mould 10 and the baffle. After the parison has been formed, the baffle 20 is removed from the mould 10 and the side portions of the mould 10 are moved away from each other. The parison is then removed by transferring means (not shown). If, on the other hand, the parison is being formed by a pressing operation in which a plunger is pressed into the mould from below, the funnel 14 is removed after the gob G has entered the mould and the baffle 20 is positioned on top of the mould 10 so that the plunger entering the mould presses the gob against the side portions of the mould and the baffle 20. The formed parison is removed in the same way as in the blowing operation.

A transceiver 30 is mounted on a side frame member of the section as shown in FIG. 1. The transceiver 30 is arranged to transmit ultrasonic radiation along a line 32 which extends horizontally above the funnel 14 when the funnel 14 is positioned on the mould 10 and cuts the path 12 at a point above the centre of the mould 10 through which a gob G must pass to enter the mould 10. The transceiver 30 is shown in FIG. 2 and comprises a piezoxyde ultrasonic disc 34 mounted to be energized by electric signals passing along a wire 36 in a steel tube 38 which is closed at one end by a closure member 40 and open at the other end so that ultrasonic radiation can leave or enter the tube 38 through the open end thereof. A suitable piezoxyde ultrasonic disc can be obtained from the Phillips Company under the designation PXE 5.

FIG. 3 shows the electronic circuit of which the transceiver 30 forms part. The transceiver 30 is connected by the wire 36 to a capacitor 38 which is also connected to energizing means 40 operable to supply energizing current to the transceiver 30 to cause the latter to emit ultrasonic radiation. If the transceiver 30 is to emit pulses of ultrasonic radiation, the energizing means 40 may be a blip oscillator. The energizing means 40 is also connected by further wires 42 to further capacitors 44 (only one shown in FIG. 3) and the capacitors 44 are connected to transceivers 46 similar to the transceiver 30 but at different sections of the glassware forming machine (only one transceiver 46 shown in FIG. 3). The wire 36 is also connected to an analog switch 48 and the remaining transceivers 46 are also connected to the analog switch 48 in similar manner. The analog switch 48 receives an input from a firing order controller 50 of the glassware forming machine which determines the firing order of the various sections of the machine. The input received from the firing order controller 50 by the analog switch 48 determines which of the signals from the transceivers 30 and 46 that the analog switch 48 passes to an echo analyser 52.

The echo analyser 52 is operable to compare the signals received from the analog switch 48 to determine whether the amplitude of the signals is consistent with an expected amplitude therefor. The echo analyser 52 also compares the phase difference between the radiation detected by the transceiver 30 and the radiation transmitted thereby. It is able to do this since it receives a combined signal representing both the radiation transmitted and the radiation received from the transceiver 30 or 46. The signals which pass the comparisons carried out by the echo analyser 52 are passed to a gob length gate 54 which compares the duration of the signal received by the transceiver 30 or 46 with an expected duration therefor. Signals which pass the comparison carried out by the gob length gate 54 are passed to a multiflexer 56 which is also connected to the firing order controller 50. The multiflexer 56 gives one set of outputs for each of the sections of a glassware forming machine. The multiflexer 56 "knows" which signals it receives from the gob length gate 54 relates to which section from signals it receives from the firing order controller 50. The outputs from the multiflexer 56 can be used for various purposes e.g. for providing a timing pulse for the machine sections.

In the illustrative method, gobs of molten glass are sensed as they pass along the path 12 which leads to the mould arrangement 10. The method comprises transmitting a series of pulses of ultrasonic radiation produced by the transceiver 30 towards a point on the path 12 so that, when the radiation arrives at the point on the path 12 while a gob G is occupying that point, the radiation is reflected by the gob G. The radiation is reflected by the gob G back along the path 32 along which it came to the transceiver 30 which also forms a detector which detects the reflected radiation. Three parameters of the radiation detected by the transceiver 30 are compared with an equal number of expected parameters for the radiation which has been reflected by a gob at said point on the path 12. The three parameters are the amplitude of the reflected radiation, the phase difference between the reflected radiation and the transmitted radiation, and the duration of the reflected radiation. The amplitude of the reflected radiation gives an indication as to whether it has been reflected by an object having approximately the reflectability of a gob G so that, for example, if the radiation is reflected by a swab brush at the point on the path 12, the amplitude of the reflected radiation will be less than if it had been reflected by a gob. The phase difference between the reflected radiation and the transmitted radiation gives an indication of the time that the radiation has taken to travel from the transceiver 30 to the point on the path 12 and back to the transceiver 30 so that reflections from objects which are not at the point on the path 12 can be eliminated. The duration of the reflected radiation indicates whether the reflected radiation corresponds in duration with the expected duration for a gob G to pass the point on the path 12.

In the illustrative method, only those radiation reflections which pass the comparisons carried out by the echo analyser 52 and the gob length gate 54 give rise to the production of a signal. Thus, the illustrative method also comprises producing a signal indicating the presence of a gob if the or each parameter of the reflected radiation is consistent with its equivalent expected parameter. The absence of a signal at a time when a gob should be present can be used to cause an alarm signal to be produced.

In a modification of the illustrative method, the energizing means 40 may energize the transceiver 30 and 46 continuously so that a beam of radiation is transmitted along the path 32 to the point on the path 12. In this case, the gob length gate 54 compares the duration of the reflected beam with an expected duration.

I claim:

1. A method of sensing gobs of molten glass as they pass along a path which leads to a mould arrangement of a glassware forming machine, the method comprising transmitting ultrasonic radiation towards a point on the path so that, when the radiation arrives at the point while a gob is occupying the point, the radiation is reflected by the gob towards a detector which detects the reflected radiation, comparing one or more parameters of the radiation detected by the detector with an equal number of expected parameters for radiation which has been reflected by a gob at said point on the path, and producing a signal indicating the presence of a gob if the or each parameter is consistent with its equivalent expected parameter.

2. A method according to claim 1, wherein the amplitude of the radiation detected by the detector is compared with an expected amplitude.

3. A method according to claim 1, wherein the phase difference between the radiation detected by the detector and the radiation transmitted is compared with an expected phase difference.

4. A method according to claim 1, wherein the radiation is transmitted as a continuous beam and the duration of the reflected beam of radiation detected by the detector is compared with an expected duration.

5. A method according to claim 1, wherein the radiation is transmitted as a series of pulses and the number of consecutive pulses in the radiation detected by the detector is compared with an expected number.

6. A method according to claim 1, wherein the radiation is transmitted and detected by a piezoxyde ultrasonic disc.

* * * * *